United States Patent Office 3,597,478
Patented Aug. 3, 1971

3,597,478
PREPARATION OF TETRAMETHYLUREA
Martin L. Weakley, Pryor, Okla., assignor to
Nipak, Inc., Dallas, Tex.
No Drawing. Filed Sept. 14, 1967, Ser. No. 671,915
Int. Cl. C07c 127/00
U.S. Cl. 260—553 7 Claims

ABSTRACT OF THE DISCLOSURE

A method for the preparation of high purity tetramethyl-urea comprising reacting dimethylamine with N,N-dimethylcarbamyl chloride, treating the crude reaction product with a suitable base, such as lime, to form a calcium chloride precipitate; filtering the treated product to remove the precipitate; and distilling the clarified liquid at or below atmospheric pressure, with or without the injection of an inert gas, to remove materials boiling outside the range of tetramethylurea. A further fractional distillation may also be carried out to remove traces of water, dimethylamine and materials boiling above and below tetramethylurea.

FIELD OF THE INVENTION

The present invention relates to a novel method for the preparation of high purity alkyl substituted urea.

DESCRIPTION OF THE PRIOR ART

A classical method of preparing alkyl substituted ureas, such as tetramethylurea, has been the reaction of a substituted carbamyl halide, such as N,N-dimethylcarbamyl chloride, with a substituted amine, such as dimethylamine. In spite of numerous attempts to improve this process, including at least one highly effective technique disclosed and claimed in applicant's copending application Ser. No. 542,364, entitled "Vapor Phase Preparation of Tetramethylurea," filed Apr. 13, 1966, it is a difficult and rather expensive task to recover purified alkyl substituted urea from the reaction product. This is particularly true when utilizing the conventional techniques as opposed to applicant's mentioned technique. The problems reported by a number of investigators include the presence in the product of substantial amounts of substituted amine hydrochloride, as dimethylamine hydrochloride, the presence of substantial amounts of materials boiling below the desired alkyl substituted urea, inherent reactions with water, even in trace amounts, yellow coloration in the product, the presence of precipitates in the product, and ultimate recoveries of only about 60% of useful product after distillation.

Prior art techniques for purifying tetramethylurea include filtering, washing with water, and thereafter solvent extracting and crystallizing tetramethylurea from the solvent. This, of course, is a rather complex and expensive process and has not been capable of producing high purity products. Another technique has included separation of immiscible liquid phases, vacuum distillation, benzene extraction followed by a second distillation and a second phase separation, and finally, an azeotropic distillation. Here again, the number of steps necessary for purification leads to complexities in the process and loss of product while still not producing effective results.

In an effort to solve the problem of purifying tetramethylurea, applicant has tried numerous techniques not reported in the prior art. For example, attempts were made to percolate the crude tetramethylurea through beds of cation exchange resins. However, the resulting product had a high water content, a low tetramethylurea content and a rather high ammonia content. Subsequent distillation of the ion exchange treated material failed to solve these problems since even the last increment of the distilled product had a rather foul odor and contained large amounts of low boiling materials. Therefore, plural treatments with cation and anion exchange resins prior to distillation were tried but the products had an even more unpleasant odor and contained even more low boiling materials. The procedure was carried still further by taking the better cuts of the prior distillation and treating the same with charcoal. The charcoal treated product was then recovered and treated with aqueous caustic and finally, again distilled. A considerable amount of time was necessary to remove essentially all of the water from the distillate fractions and consequently the amount of tetramethylurea in the product was reduced and the product still contained undesirable materials. In still another effort, a very precise distillation was carried out with essentially no reflux in the product. The resultant material was then treated with aqueous caustic and redistilled and finally the product was distilled a third time with effective reflux. Even with this highly critical and demanding procedure, it was found that the product still contained relatively large amounts of water, dimethylamine hydrochloride and ammonia. Further, the amount of material requiring reprocessing was undesirably high. Thus, it can be seen that while these techniques might be classified as "partially successful," they did not produce a satisfactory product in adequate quantities.

SUMMARY OF THE INVENTION

It is therefore an object of the present invention to provide an improved process for producing high purity substituted ureas by the reaction of a substituted carbamyl halide with an amine.

A further object of the present invention is to provide an improved process for the preparation of a high purity alkyl substituted urea by the reaction of an alkyl substituted carbamyl chloride with an alkyl amine.

Yet another object of the present invention is to provide an improved process for the preparation of high purity tetramethylurea by the reaction of N,N-dimethylcarbamyl chloride and dimethylamine.

Another and further object of the present invention is to provide an improved process for the present invention is to provide an improved process for the preparation of high purity substituted ureas by reacting a substituted carbamyl chloride with an amine, treating the resultant liquid product with a base and thereafter distilling the treating liquid product.

A yet further object of the present invention is to provide an improved process for the preparation of high purity substituted ureas by the reaction of a substituted carbamyl chloride with an amine, treating the resultant liquid material with a base, distilling the treated product and passing an inert gas through the distilled product.

Another object of the present invention is to provide an improved process for the preparation of high purity substituted ureas by reacting a substituted carbamyl chloride with an amine, treating the liquid product with a base, distilling the treated product to recover the substituted urea, passing an inert gas through the distilled product, and further distilling the product to produce a product free of materials boiling above and below the substituted urea.

Briefly, the present invention comprises preparing a substituted carbamyl chloride with an amine, treating the liquid product of the reaction with a base in an amount sufficient to neutralize hydrochlorides of the substituted amines, removing precipitated salts from the liquid product, distilling the treated mixture to recover a fraction substantially free of materials boiling above and below the substituted urea, and thereafter passing an inert gas through the distilled product to remove odor-forming materials. A final distillation to remove materials boiling above and below the boiling range of the substituted urea may also be carried out.

DETAILED DESCRIPTION OF THE INVENTION

It has been found in accordance with the present invention that high purity substituted ureas, particularly alkyl substituted ureas such as tetramethylurea, can be produced in a state of high purity by following the procedure of the present application.

Substituted ureas, particularly alkyl substituted ureas such as tetramethylurea, can be prepared by several methods which involve the reaction of a substituted carbamyl halide with an amine. For example, any substituted carbamyl halide, particularly alkyl substituted carbamyl halides, may be used. Suitable substituted carbamyl halides include alkyl substituted carbamyl halides, such as dialkyl compounds.

Suitable amines include lower dialkyl amines having from 1 to 5 carbon atoms in each alkyl group, such as dimethylamine, diethylamine, dibutylamine, diamylamine, etc., tri-substituted amines.

The reaction is preferably carried out in a vapor state while maintaining a temperature between about 170° and 310° C. The crude product may thereafter be clarified by at least one filtration to remove a major amount of the hydrochlorides which are generally formed from the amine reactant. For example, when dimethylamine is reacted with dimethylcarbamyl chloride, substantial volumes of dimethylaminehydrochloride are produced. Following the preliminary clarification of the liquid tetramethylurea product, there still remains substantial amounts of the hydrochloride, substantial amounts of materials boiling below the boiling point of the desired urea, substantial amounts of water and some precipitated solids and the product usually has a yellow color and a foul odor. Therefore, it has been found that if the clarified crude product is then treated with a base, such as lime, calcium hydroxide or similar materials, in an amount sufficient to neutralize the hydrochloride, the hydrochloride contaminant can be substantially removed. Neutralization of the hydrochloride is preferably followed by a filtration to remove the resultant salts. Thereafter, the liquid product is distilled to recover the material boiling in the range of the desired substituted urea and containing essentially no materials boinling above and below this range. In most cases, the distilled product will be satisfactory. However, it has been found that a rather strong odor often persists and, as a practical matter, this odor should be removed. It has further been found in accordance with the present invention that this odor can be eliminated for all practical purposes and additional contaminants removed by passing a dry, inert gas through the material with or without concomitant distillation. The distillation is preferably conducted with no reflux. A pressure below atmospheric pressure can also be utilized to reduce the time required and to aid in the obliteration of gaseous impurities. Suitable inert gases for this purpose include argon, nitrogen, etc. A final fractional distillation can then be carried out to eliminate essentially all of the reactants, water and traces of high boiling materials. The following specific examples illustrate the advantages of the invention.

In all instances, crude tetramethylurea was prepared by the reaction of dimethylamine with N,N-dimethylcarbamyl chloride. This crude product contains numerous impurities including unreacted dimethylamine and/or monomethylamine and dimethylcarbamyl chloride, water, dimethylamine hydrochloride, and it possesses a rather foul odor.

The following examples illustrate the extreme difficulty encountered in attempting to purify crude tetramethylurea by so-called conventional, single- or multi-step purifying techniques.

A sample of crude tetramethylurea product was first treated with "IR-120(H)" cation exchange resin manufactured by Rohm and Haas. This resin was placed in a column and the crude tetramethylurea was allowed to percolate through the resin bed. The resulting product showed a water content of 9.2%, a tetramethylurea content of only 83.7%, and a titer as ammonia of 0.55%.

In another test, a combination of ion exchange and distillation was attempted. In this instance, Rohm and Haas "IR-45" activated ion exchange resin was utilized in a manner similar to the previous test. Thereafter, the product was distilled at atmospheric pressure of 738 mm. The result of this distillation is shown in the following Table I.

TABLE I

| Sample Number | Temperature, °C. | | | Product | | Remarks |
|---|---|---|---|---|---|---|
| | Base | Column | Head | Volume, ml. | $n_D^{25}$ | |
| Time: | | | | | | |
| 1030 | 1 | 178 | 155 | 143.2 | 200 | | Foul odor. |
| 1330 | 2 | 183 | 168 | 174 | 200 | | Some gelatinous material, washed from head. |
| 1430 | 3 | 183 | 174 | 174.1 | 200 | | Crystals in product. |
| 1445 | 4 | 183 | 174 | 174.3 | 200 | [1]1.4490 | |
| 1520 | 5 | 183 | 175 | 174.9 | 200 | | |
| 1540 | 6 | 183 | 175 | 175 | 200 | | |
| 1555 | 7 | 183 | 175 | 175 | 200 | | |
| 1607 | 8 | 183 | 175 | 175 | 200 | | |
| 1620 | 9 | 183.5 | 175 | 175 | 200 | | |
| 1635 | 10 | 183.7 | 175 | 175 | 200 | | |
| 1720 | 11 | 183 | 175 | 175 | 1,000 | | Odor somewhat improved. |
| 1803 | 12 | 183 | 175 | 175 | 1,000 | [1]1.4490 | |
| 1829 | 13 | 183.2 | 175.1 | 175.1 | 1,000 | | |
| 1855 | 14 | 183.3 | 175 | 175.1 | 1,000 | | |
| 1920 | 15 | 183.8 | 175 | 175.5 | 1,000 | 1.4492 | |
| 1950 | 16 | 184.5 | 175.2 | 175.8 | 1,000 | 1.4495 | |
| 2015 | 17 | 185 | 175.3 | 176.1 | 1,000 | 1.4496 | |
| 2045 | 18 | 187 | 177 | 177 | 1,000 | 1.4500 | |
| 2115 | 19 | 200 | 178 | 180 | | | |

[1] At 24.5° C.

The foul odor of this product persisted even in the last sample of the distillation treatment. Accordingly, another series of treatments was carried out utilizing repeated, successive treatments of the crude tetramethylurea with cationic and anionic resins prior to distillation. However, the products of these treatments had an even more unpleasant odor and even larger amounts of low boiling materials were obtained.

In still another effort to purify the tetramethylurea, the better fractions of the previous distillations were combined and treated with charcoal. The charcoal treated tetramethylurea was recovered by filtration and combined with a 50% aqueous solution of caustic. The resulting necessary to neutralize the residual dimethylamine hydrochloride. Thereafter, fractional distillation produced a product containing in excess of 99% tetramethylurea, 0.59% water and essentially no chloride. The following Table IV shows the results of this distillation.

While specific examples and illustrations have been given above, it is to be recognized that variations of the specific techniques may be practiced by one skilled in the art without departing from the present invention.

TABLE IV

| Sample No.: | Boiling temperature, °C. | TMU, percent | Remarks |
|---|---|---|---|
| 1 | 177.0–177.2 at 742 mm | 99+ | 0.03% Cl, 0.17% water, 24.21% N, no amine. |
| 2 | 177.0–177.2 at 739.5 mm | 99+ | 0.03% Cl, 0.21% water, 24.43% N, no maine. |
| 3 | 177.0–177.30 | 99+ | |
| 4 | 176.9–177.30 | 99+ | |
| 5 | 176.5–177 at 736 | | |
| 6 | 176.9–177.2 | | 99.8 0.2% water, no (CH$_3$)$_2$ NH. |
| 7 | 176.9–177.1 | | |
| 8 | 176.9–177.0 | | |

The above-mentioned distillation was carried out with recycle of the first fractions to the distillation column to thereby conserve time. While operating in this manner, it was found that a nearly quantitative recovery of tetramethylurea was obtained without resorting to a long and costly fractionation period, which would have been necessary without recycle of the low boiling materials. Under these circumstances, also, the residual materials of the distillation were essentially negligible. A reduced pressure may be utilized during distillation, in order to reduce the time required for distillation and to aid in the elimination of gaseous impurities.

By way of contrast, a similar treatment was carried out without lime addition prior to distillation. Products obtained by this treatment contained 98.2% tetramethylurea, in excess of 1% dimethylcarbamyl chloride, 0.73% water, and 0.37% chloride.

It has also been found, according to the present invention, that dry gas sparging of the tetramethylurea, either during distillation or after distillation, results in separation of substantially all of the remaining contaminants and the elimination of any malodor from the product.

In a test of gas sparging of a lime treated, distilled tetramethylurea product, produced as specified in the previous example, a 5 lb. sample of the treated material was analysed and found to contain 99.5% tetramethylurea, 0.12% water and a minute quantity either of dimethyl- or monomethylamine (by chromatographic analysis) and had an irritating amine or ammonia odor partially masking a more undesirable odor. The sample was sparged with dry nitrogen for 20 hours. The sparged sample contained essentially none of the unknown components and had the pleasant odor of tetramethylurea.

A final fractional distillation, which may include gas sparging if this treatment has not previously been utilized, has been found to remove essentially all of the residual impurities and produce the highly purified product of the present invention.

As a practical matter, and for convenience of equipment design and operation, the previously mentioned treatment can be broken down into four separate phases; in a first phase, the basic material is added to the crude tetramethylurea with stirring. Thereafter, the lime-treated material is filtered to separate solid components therefrom. In the third phase of the treatment, distillation at atmospheric or reduced pressure and with or without the injection of an inert gas is carried out. As indicated, a fourth and final step of fractional distillation may be added to thereby eliminate essentially all dimethyl- or monoethylamine and water from the product and separate the tetramethylurea (boiling at about 175° to 176° C.) from traces of higher boiling materials.

While operating in accordance with the present invention, a large number of treatments of crude tetramethylurea have been found to produce tetramethylurea having a purity greater than 99.5%.

Accordingly, this invention is to be limited only by the appended claims.

What is claimed is:

1. In a method of purifying a tetraalkyl urea product formed by the reaction of a dialkyl amine having from 1 to 5 carbon atoms in its alkyl group and dimethyl carbamyl chloride, and containing dialkyl amine hydrochloride as a contaminant, the improvement comprising adding to said tetraalkyl urea solid lime in an amount sufficient to neutralize said dialkyl amine hydrochloride, thereafter separating the resultant precipitated salts from said tetraalkyl urea and finally distilling the product to recover said tetraalkyl urea.

2. A method in accordance with claim 1 wherein materials boiling below the tetraalkyl urea which are removed during the distillation step are recycled to said distillation step.

3. A method in accordance with claim 1 wherein the distillation step is carried out at sub-atmospheric pressure.

4. A method in accordance with claim 1 wherein a dry, inert gas is blown through the material after distillation.

5. A method in accordance with claim 1 wherein a dry, inert gas is passed through the distilled product after completion of the distillation.

6. A method in accordance with claim 1 wherein a dry, inert gas is passed through the material during distillation and the resultant product is thereafter subjected to a second distillation.

7. A method in accordance with claim 1 wherein the precipitate is removed from the tetraalkyl urea by filtration.

References Cited

UNITED STATES PATENTS 2,993,930   7/1961   Chappelow et al.   260—553
2,403,068   7/1946   Franz et al.   260—553

FOREIGN PATENTS 1,295,353   5/1962   France   260—553

OTHER REFERENCES

Lüttringhaus et al., Agnew Chem., vol. 75, No. 22, pps. 1059–1068 (1963).

Theilheimer, Synthetic Methods of Organic Chemistry (yearbook), vol. 11, Interscience Publishers, Inc., New York, p. 219 (1957).

Webster's Seventh New Collegiate Dictionary, Merriam Company, Springfield, Mass., p. 256 (1965).

Gattermann, L., Organic Chemistry, The Macmillan Co., New York, N.Y., pps. 25–29 (1923), QD261 G26pe 1914.

BERNARD HELFIN, Primary Examiner

M. W. GLYNN, Assistant Examiner